May 6, 1924.
M. C. VILES
1,492,870
SUBSOILER ATTACHMENT FOR PLOWS
Filed Oct. 21, 1922
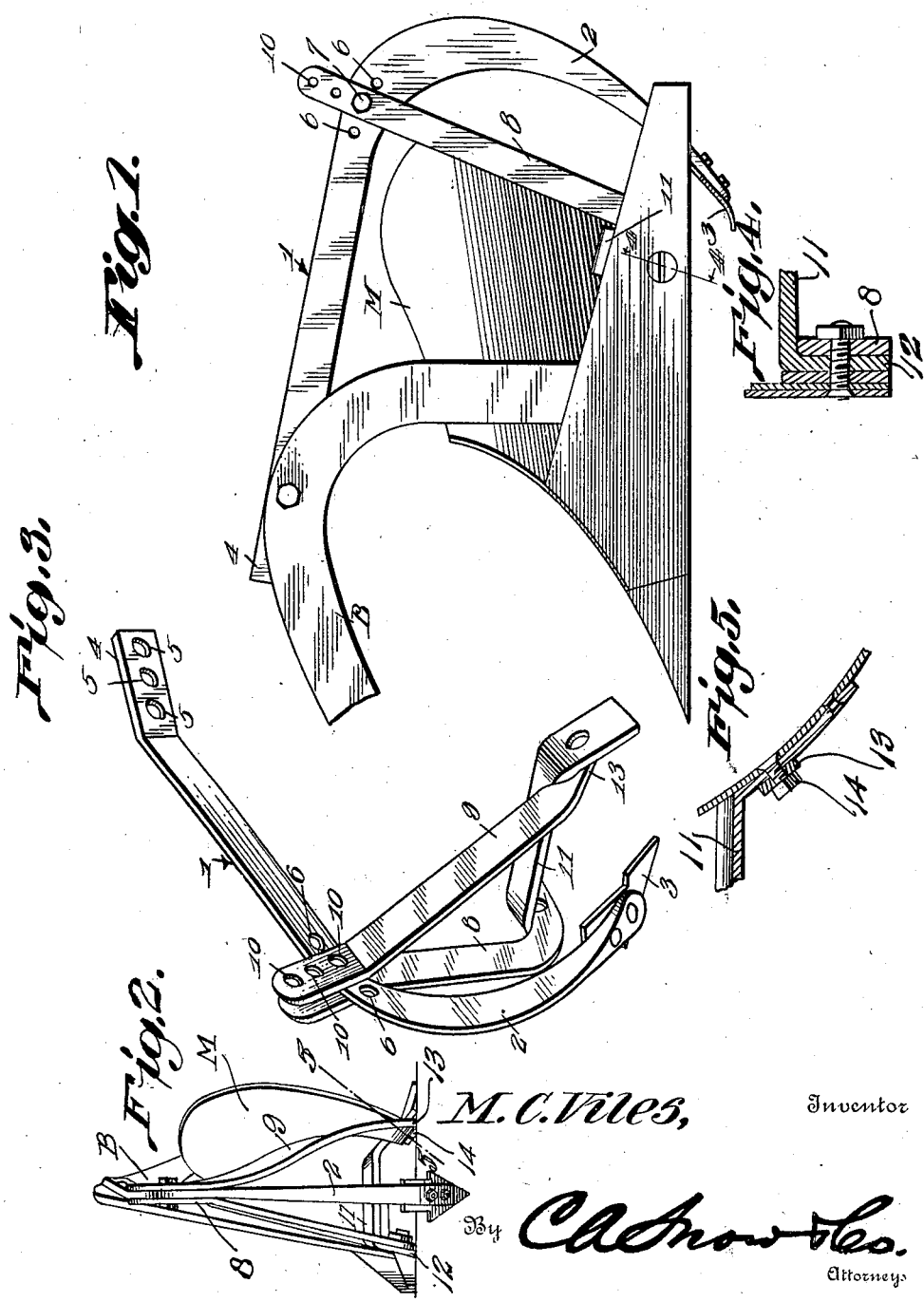
M. C. Viles, Inventor
By C. A. Snow & Co.
Attorneys Patented May 6, 1924.

1,492,870

UNITED STATES PATENT OFFICE.

MACK C. VILES, OF MARAMEC, OKLAHOMA.

SUBSOILER ATTACHMENT FOR PLOWS.

Application filed October 21, 1922. Serial No. 596,026.

*To all whom it may concern:*

Be it known that I, MACK C. VILES, a citizen of the United States, residing at Maramec, in the county of Pawnee and State of Oklahoma, have invented a new and useful Subsoiler Attachment for Plows, of which the following is a specification.

This invention relates to plows, and more particularly to subsoiler attachments therefor.

The object of the invention is to provide a simple and efficient subsoiler attachment of this character for use in connection with plows of various types which is constructed so as to resist the enormous side strains to which they are to be subjected, and also is rigidly mounted on the plow and transferring the rigidity to the subsoiler beam.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a plow equipped with this improved attachment.

Fig. 2 is a rear elevation thereof.

Fig. 3 is a detail perspective view of the subsoiler attachment detached.

Fig. 4 is a detail sectional view taken on the line 4—4 of Fig. 1, and

Fig. 5 is a similar view taken on the line 5—5 of Fig. 2.

In the embodiment illustrated, the attachment constituting this invention comprises an attaching beam 1 having a downwardly and forwardly extending shovel carrying arm 2 on the terminal of which a subsoiler shovel or share 3 is mounted in any suitable manner, being preferably bolted thereto to provide for its renewal when necessary.

The front end 4 of the beam 1 is deflected laterally and provided with a plurality of longitudinally spaced bolt receiving apertures 5, said end 4 being designed to lie flat against the plow beam B as shown clearly in Fig. 1, the apertures 5 providing for the adjustable connection of the attaching beam to the plow beam. The beam, adjacent its junction with the arm 2, is provided with a plurality of longitudinally spaced apertures 6 for the reception of a bolt 7 which connects two brace bars 8 and 9 to beam 1. These bars are provided at their upper ends with a plurality of longitudinally spaced apertures 10 to provide for their adjustable connection with the attaching beam. These brace bars diverge toward their lower ends, and as shown, the bar 9 is twisted at its free end to position the terminal thereof flat against a moldboard M or rather against a cross brace 11. The other brace 8 has its free end bent laterally forward and lying in the same plane as the body of the brace and is apertured to receive a connecting bolt for uniting it to either the land side of a plow or to the other moldboard when it is used on a middle buster plow.

The cross bar 11 which connects the lower ends of the brace bars 8 and 9 has its ends bent in the same direction, one of said ends 12 being bent at right angles and the other end 13 slightly twisted and bent at an obtuse angle to lie flat against the inner face of the moldboard, being connected with the moldboard by the bolt which connects the brace bar 9 with the moldboard, said end being additionally secured by riveting to render it rigid.

While this attachment is shown mounted on the ordinary moldboard plow, it is to be understood that it is designed for use in connection with various other forms of plows, either singles or gangs, as well as lister and middle busters.

It is of course understood that since all makes of plows are not the same, some slight adjustments will be necessary in the curvature and length of the parts constituting this invention, but only a trifle will be necessary, the principle remaining the same.

When the attachment is to be used in connection with the middle buster plow which has double moldboards, the brace 8 is eliminated and a brace corresponding to the brace 9 substituted except that it is formed in exactly opposite curves to brace 9 to adapt it to fit the left hand moldboard.

From the above description it will be obvious that this attachment is extremely simple in construction, rendering it cheap to manufacture and easily applied as well as imparting rigidity to the plow in connection with which it is used. This rigidity is obtained by means of the side braces 8 and 9 in connection with the cross brace 11 which securely hold the subsoiler beam so as to resist immense strains in addition to supporting each other rigidly and transmitting such rigidity to the subsoiler beam. Moreover, the twin braces used in the structure constituting this invention operate to reduce the weight of the attachment in addition to producing the rigidity above set forth.

I claim:

1. A subsoiler attachment comprising an attaching beam having a downwardly and forwardly extending shovel carrying arm, twin braces connected at their upper ends to said beam and diverging toward their lower ends, and a cross brace connecting the lower ends of said twin braces and adapted to be connected to the plow.

2. An attachment of the class described comprising an attaching beam having its free end laterally offset and provided with a plurality of longitudinally spaced apertures, said beam adjacent its junction with said arm being also apertured, a pair of twin braces designed to be bolted at their upper ends to said attaching beam, the free end of one of said braces being twisted to lie against the inner face of the plow moldboard, a cross bar connecting the lower ends of said braces, said cross bar having laterally extending ends for connection with the brace ends.

3. A subsoiler attachment comprising an attaching beam, twin braces connected at their upper ends to said beam, and a cross brace connecting the lower ends of said twin braces and adapted to be connected to a plow.

In testimony that I claim the foregoing as my own, I have hereto affixed my signature in the presence of two witnesses.

MACK C. VILES.

Witnesses:
W. J. WISLEY,
JAMES C. RYAN.